United States Patent [19]

Richards

[11] Patent Number: 5,247,358
[45] Date of Patent: Sep. 21, 1993

[54] DISPLAY APPARATUS HAVING MEANS FOR GENERATING A TEST SIGNAL ON THE DISPLAY TO FACILITATE ADJUSTMENT OF A PROPERTY OF THE DISPLAYED IMAGE

[75] Inventor: Norman D. Richards, Horsham, England

[73] Assignee: U.S. Philips Corporation, New York, N.Y.

[21] Appl. No.: 913,566

[22] Filed: Jul. 14, 1992

[30] Foreign Application Priority Data

Jul. 22, 1991 [GB] United Kingdom ................. 9115809

[51] Int. Cl.$^5$ ........................................... H04N 17/04
[52] U.S. Cl. ...................................... 358/139; 358/10
[58] Field of Search ........................ 358/139, 10, 230

[56] References Cited

U.S. PATENT DOCUMENTS

4,562,469 12/1985 Graham .............................. 358/139
4,724,484 2/1988 Ward .................................. 358/139
4,891,700 1/1990 Meunier ............................. 358/139

FOREIGN PATENT DOCUMENTS

2716212 10/1978 Fed. Rep. of Germany.

OTHER PUBLICATIONS

S. F. Quinn et al., "Pluge Method of Adjusting Picture Monitors in Television Studios—A Technical Note", Journal of the SMPTE, vol. 76, p. 925 (Sep. 1967).

Primary Examiner—Victor R. Kostak
Attorney, Agent, or Firm—Edward W. Goodman

[57] ABSTRACT

The display apparatus includes circuitry for generating video signals for the display of still or motion pictures on a CRT or other display device. The apparatus further includes an arrangement for generating a test signal to display a test image to facilitate adjustment of the brightness (black level) setting of the CRT. The test image includes adjoining regions (100,102) of black and below-black levels, to forming a first image feature which is invisible at the correct brightness setting. If the brightness setting is too high, the first image feature is visible and forms a symbolic instruction indicating the necessary corrective adjustment. The test signal may be stored with picture information on a storage device.

12 Claims, 2 Drawing Sheets

DISPLAY APPARATUS HAVING MEANS FOR GENERATING A TEST SIGNAL ON THE DISPLAY TO FACILITATE ADJUSTMENT OF A PROPERTY OF THE DISPLAYED IMAGE

BACKGROUND OF THE INVENTION

1. Field of the Invention

The invention relates to a video signal processing apparatus comprising means for generating video signals to enable the display of still or motion pictures on a connected display device, and means for generating a test signal to enable the display of a test image to facilitate user adjustment of a property of the display device to a correct setting which provides optimum representation of the pictures.

Such apparatuses include television receivers, where the display device is included in the apparatus, but also VCR's and other video and interactive video reproduction apparatuses, including CDV, CD-I, Laservision, Photo-CD and computer workstations, where the display device usually comprises a separate monitor or TV receiver.

The invention further relates to a method of storing pictures on a record carrier for subsequent reproduction via a display device having at least one user-adjustable display property, the method comprising:

(a) storing picture information on the record carrier in a form suitable for reproduction by the display device;

(b) defining a test signal suitable for causing the display of a test image including a first image feature imperceptible at a display property setting which is correct for the display of the stored pictures but visible when the display property deviates in a given direction from the correct setting; and (c) storing information defining the test signal on the record carrier together with the picture information, characterized in that the first image feature, when visible, forms at least part of a symbolic instruction to the user indicating the nature of the deviation and/or the necessary corrective adjustment.

The accurate representation of pictures by the display device used with such apparatuses requires proper setting of the black level (brightness) and other properties of the display device (color, contrast etc.). This is particularly important when display devices such as cathode ray tubes (CRTs) and liquid crystal displays (LCDs) are used to represent natural photographic images, since CRTs and LCDs have very low dynamic range (contrast ratio) compared with photographic film. This makes it important to utilize fully the dynamic range that is available, by correct brightness setting.

2. Description of the Related Art

It is known that test images are useful tools in the setting of black levels, and DE-A-2 716 212 (PHD 77024) proposes a television receiver with a built-in test pattern generator. This test pattern, in common with many broadcast 'testcard' patterns, includes adjoining regions of black and dark grey. If the brightness is set too low, the black and grey are indistinguishable, whereas, if the setting is correct, they are just visible as distinct features. The adjustment is necessary to maintain optimum dynamic range as viewing conditions (especially ambient lighting) change.

A first problem with the known test images is that the person making the adjustment requires to know the significance of the pattern, and the correct procedure for its utilization. In practice, only an engineer, if anybody, uses the known test patterns. This may be satisfactory, for example, in a professional studio environment, where engineers are available and where the ambient lighting conditions are constant and carefully controlled. However, the problem addressed here and in DE-A-2 716 212 is that, in the domestic and general business environment, engineers are not available, while the viewing conditions can vary widely and frequently.

Another problem with the test pattern proposed in DE-A-2 716 212, and with the known broadcast test patterns, is that the unskilled user, even with reference to an instruction manual, is required to judge when the difference between the black and grey regions is "just perceptible". There is no visual confirmation to prevent the user adjusting the black level too low, since the two shades displayed remain discernible at all brightness settings above the correct one.

In the professional studio engineering environment, test signal generators are known in which an area below black level is included adjoining a black area in addition to an above-black (grey) area. See for example Quinn and Siocos: "Pluge Method of Adjusting Picture Monitors in Television Studios—A Technical Note", Journal of the SMPTE Vol. 76 p 925 (September 1967). In such a case, the setting is correct when the above-black level is discernible, but the black and below-black areas are indistinguishable. Such test patterns are also commonly recorded before program material on video tapes in professional environments. Such a test pattern is not known to have been broadcast or included in a domestic television set or video recording, however, and in any event its significance and the manner of its exploitation are not readily appreciated by the average professional or domestic user.

SUMMARY OF THE INVENTION

It is an object of the invention to facilitate an accurate and optimum setting of display device adjustments such as brightness in an intuitive manner.

The invention provides a video signal processing apparatus comprising means for generating video signals to enable the display of still or motion pictures on a connected display device, and means for generating a test signal to enable the display of a test image to facilitate user adjustment of a property of the display device to a correct setting which provides optimum representation of the said pictures, characterized in that the test image includes a first image feature imperceptible at the correct setting, but visible when the display device deviates in a given direction from the correct setting, and in that the first image feature when visible forms at least part of a symbolic instruction to the user indicating the nature of the deviation and/or the necessary corrective adjustment.

The invention enables, by simple means, the provision of dynamic on-screen instructions to the user, these instructions indicating the necessary adjustment and being apparently responsive to the user's adjustments by disappearing when the setting is correct. The instructions may be formed by shaping the first image feature to form words or pictograms, so that the necessary adjustment is immediately apparent even to a user unfamiliar with the apparatus, without reference to an instruction manual or other training.

Various settings may be effected in this way. Where the video signals include luminance information ranging upward from a black level, the first image feature may comprise a first regions at black level adjoining a second region at a level below black level respectively, these regions being represented in the test signal but being indistinguishable in the test image when displayed at the correct setting of the black level in the display device. The instruction conveyed by the first image feature in that case should prompt the user to reduce the brightness setting of the television or other display device.

The test image may further include a second image feature which is just visible at the correct setting, but becomes imperceptible in the event of excessive corrective adjustment. This second image feature may be at a similar level to the feature proposed in DE-A-2 716 212, and complements the functioning of the first image feature by preventing over-correction by the user in response to the first image feature.

The test image may be generated automatically in response to a user commencing adjustment of the display device brightness or other property.

Where the video signal generating means comprises means for reproducing still or motion picture sequences stored on a record carrier, the test signal generating means may operate automatically to facilitate adjustment of the display device prior to viewing, or it may operate at user selection only.

Where the pictures to be displayed are stored pictures, as for example on a video cassette, interactive video disc or CD-ROM, then it may be advantageous for the test signal to be defined by information stored on the record carrier itself. In particular, this has the advantage that the invention can be implemented using for the most part conventional display apparatus hardware.

Accordingly, the invention further provides a method of storing pictures on a record carrier for subsequent reproduction via a display device having at least one user-adjustable display property, the method comprising:
(a) storing picture information on the record carrier in a form suitable for reproduction by the display device;
(b) defining a test signal suitable for causing the display of a test image including a first image feature imperceptible at a display property setting which is correct for the display of the stored pictures but visible when the display property deviates in a given direction from correct setting; and
(c) storing information defining the test signal on the record carrier together with the picture information, characterized in that the first image feature, when visible, forms at least part of a symbolic instruction to the user indicating the nature of the deviation and/or the necessary corrective adjustment.

To facilitate a brightness setting adjustment, the step (b) may include:
identifying a range of luminance values to be represented in the display of the recorded pictures, said range extending upwards from a black level;
defining as the first image feature a first region at the black level adjoining a second region at a level below the black level respectively, these regions being represented in the definition of the test signal.

The step (a) may comprise endcoding digitized photographs and storing the resulting code on the record carrier. While it would be possible to store the test image as a digitized photograph, processed as necessary to obtain levels outside the "legal" range, it may be simpler if the step (c) comprises storing code for configuring the display apparatus to generate the test signal synthetically.

The invention yet further provides a record carrier whereon pictures have been stored by a method in accordance with the invention as set forth above.

BRIEF DESCRIPTION OF THE DRAWINGS

Embodiments of the invention will now be described, by way of example, with reference to the accompanying drawings, in which.

DESCRIPTION OF THE PREFERRED EMBODIMENTS

The invention can be applied in a wide range of display systems, from simple domestic television sets, through VCRs, video disc and interactive disc players to high-end graphics workstations. In all these devices there is a desire to ensure that the display device adjustments, such as brightness, color and contrast, are adjusted regularly to take account of various viewing (lighting) conditions. Only then is it certain that the limited dynamic range (for example) of the display device, be it a CRT, LCD or whatever, is exploited fully in the representation of photographic and other images. By way of example only, the Figures present an embodiment in the form of an interactive video application using the Compact Disc-Interactive (CD-I) standard.

Figure 1:
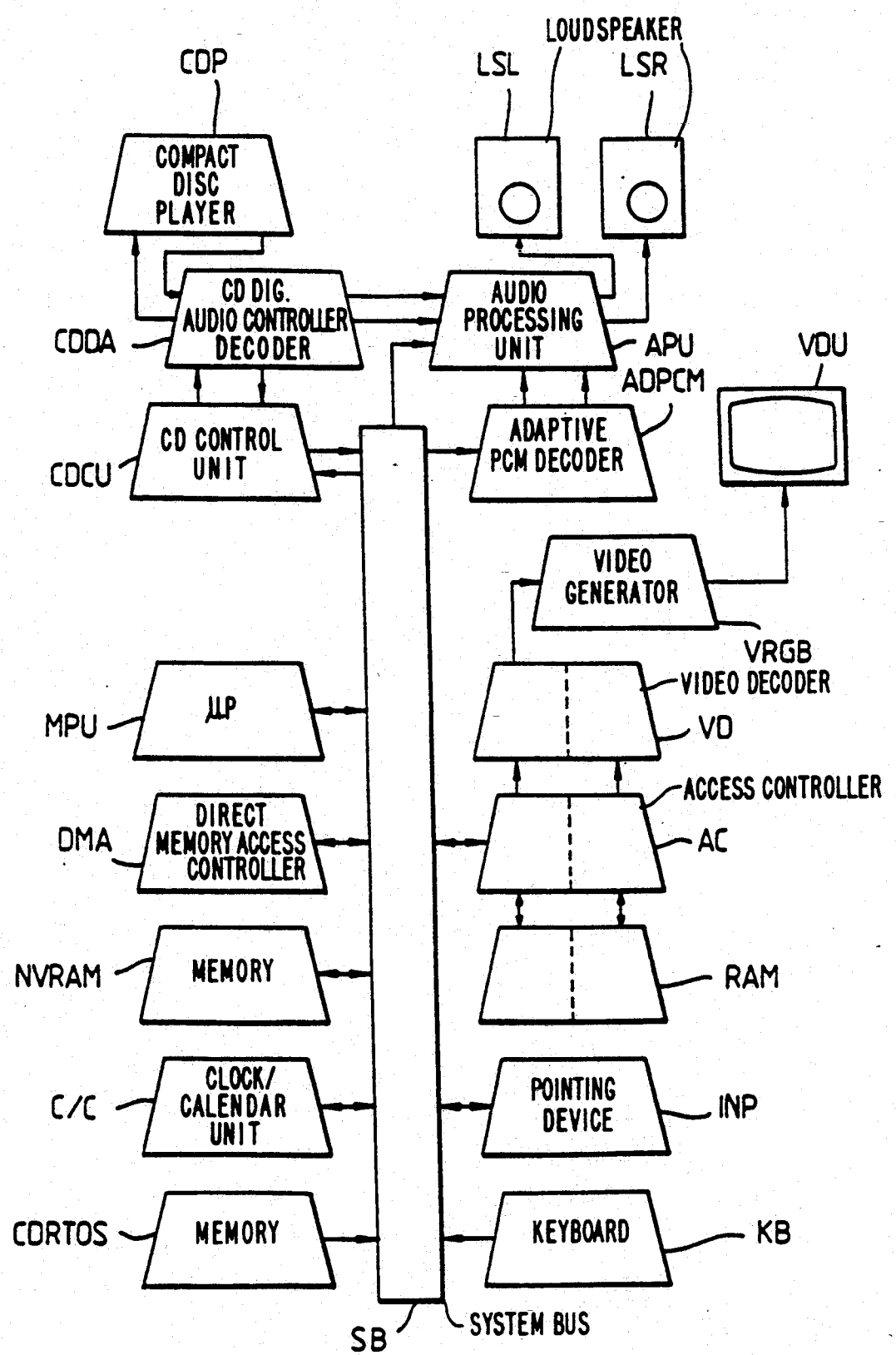
FIG. 1 shows in block schematic form a display apparatus in the form of a CD-I player connected to a display device.

FIG. 1 is a block schematic diagram of the compact disc-interactive (CD-I) player. It comprises a compact disc player CDP to which is connected a compact disc digital audio controller decoder CDDA and a compact disc control unit CDCU. The CDDA is connected to an audio processing unit APU which feeds two loudspeakers LSL and LSR. The CD control unit CDCU is connected to a system bus SB along which various digital signals are passed. Also connected to the system bus SB are a microprocessor unit MPU, a DMA controller DMA, a non-volatile random access memory NVRAM, a clock calendar unit C/C, a read-only memory containing the real-time operating system CD RTOS, a keyboard KB, a pointing device INP, and an access controller AC. The access controller controls the reading from and writing to a random access memory RAM which is split into two banks zero and one. The access controller is also connected to a video decoder VD which in turn feeds a video generator VRGB, the output of which is connected to a video display unit VDU. Also connected to the system bus SB is an adaptive pulse code modulation decoder ADPCM which feeds the audio processing unit APU. A description of the CD-I base case decoder as shown in FIG. 1 is given in a text book entitled "Compact Disc-Interactive, A Designer's Overview" edited by Philips International and published by Kluwer Technical Books, ISBN 920121103.

The video decoder VD in the CD-I player can read picture information which has been transferred from a compact disc (CD-ROM) to the random access memory RAM, which leads to the generation of appropriate video signals for the VDU by the video generator RGB. The Philips/Kluwer book describes how various picture coding formats are available. In particular, a mode called DYUV ('Delta-YUV') provides compact DPCM coding of natural colour photographs. A further mode is proposed for use in the production versions of CD-I, using Discrete Cosine Transform (DCT) coding to achieve data compressions high enough for full-screen, full-motion video pictures.

Other coding modes, using a color look-up table (CLUT) in the decoder VD, allow coding of synthetic graphics and text images containing a limited range of colors. For all these modes, a standard 8-bit range of levels (0-255) is adopted for each of red, green and blue. In accordance with CCIR recommendations, black level is defined as 16, not zero, and peak white is defined as 235, not 255, to allow for some overshoot in the processing of the video signals.

The levels 0-16 should all appear uniformly black if the brightness of the VDU is correctly adjusted, but the codes 0-15 (below black level) are nonetheless represented by lower R,G,B signal levels in the video output signal. This allows the decoder VD and video generator VRGB to be used as a test signal generator in accordance with the invention, by the inclusion of suitable configuring information on a CD-I disc, or in the read-only memory CDRTOS. In other types of display apparatus, some specific hardware provision may be required to generate the test signal, but this need not be expensive, and is well within the capabilities of the person skilled in the art.

Figure 2:
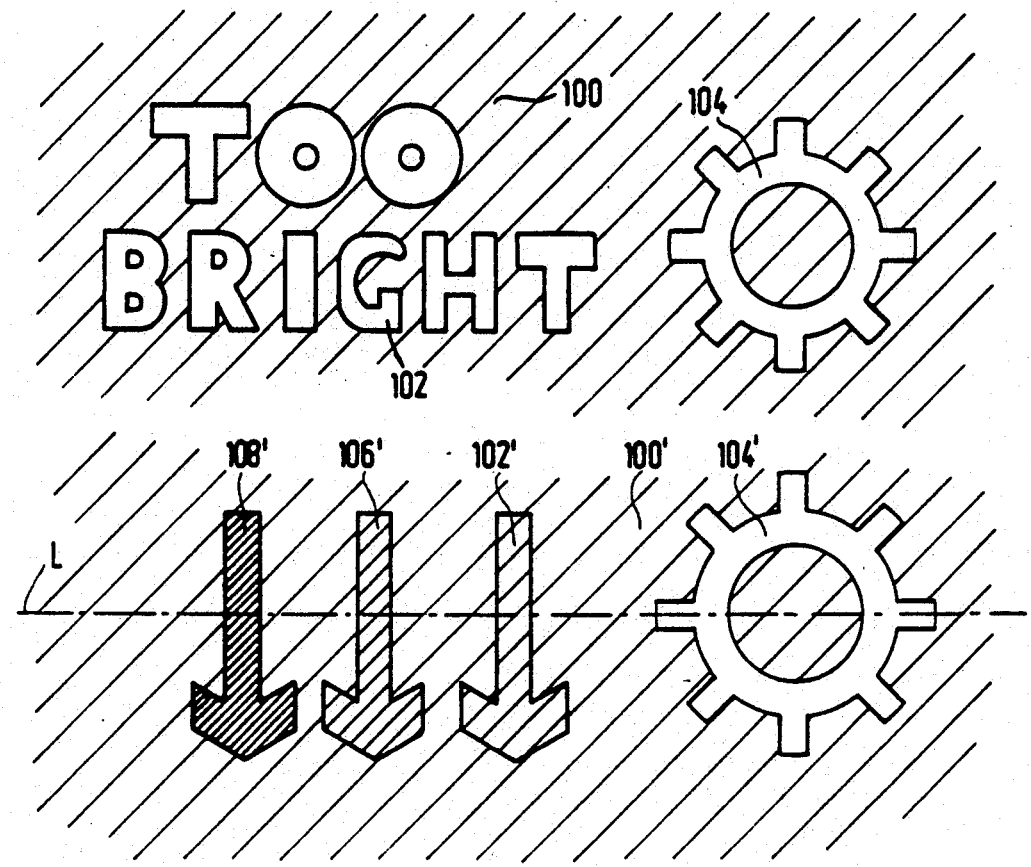
FIG. 2 represents two test images for facilitating brightness setting of a display device.

FIG. 2 shows in its top and bottom halves two test images that may be generated to facilitate accurate brightness setting in accordance with the invention. In both images, a background area 100/100' is at black level and must therefore be imagined by the reader to be in fact black when displayed correctly. In conjunction with the black background 100/100', a first image feature is defined by a region or regions 102/102' which are at a level just below black. A second image feature is defined in each test image by the background 100/100' in conjunction with a region 104/104' which is at a grey level slightly above black.

A CD-I disc loaded into the player of FIG. 1 contains a large number of photographic images stored in DYUV form as described in the Philips/Kluwer book, to be retrieved, decoded and displayed by the CD-I player as part of an interactive audiovisual presentation. The test image of FIG. 2 (top half, or bottom half) is displayed by the player in a compulsory or user-selected start-up phase of the presentation, prior to display of the stored photographs. When the VDU brightness setting is correct, the second image feature 100/104 is just discernable by the user on the VDU screen, while the first image feature 100/102 is not.

If the brightness is set too high, however, then the levels below black level in the video test signal which defines the test image will be represented on screen, so that the first image feature is visible to the user.

The first image feature 100/102 in the FIG. 2, top half, forms the words "TOO BRIGHT", which inform the user that the brightness is set too high. The user is therefore instructed by the test image to decrease the brightness until the correct setting is reached, at which point the works "TOO BRIGHT" will disappear from view. If the user raises the brightness beyond the correct setting, the second image feature 100/104 will also disappear, informing the user accordingly. The user can then correct downwards until the second image feature 100/104 is again discernable. The user then knows that the brightness setting is at the correct level. The second image feature 100/104 corresponds to the black and grey areas in the test pattern proposed in DE-A-2 716 212, mentioned above. In that known pattern, the background is grey while the center is black. It will be appreciated that the test images described herein will work just as well in this inverted form. DE-A-2 716 212 offers guidance on the minimum size for these image features, relative to the screen size, which can be used to avoid dazzling by other, brighter parts of the image.

In FIG. 2, lower half, the first image feature 100'/102' is a pictographic instruction to decrease the brightness setting, in the form of a downwards arrow. This may be a preferable form of instruction for a product in an international market, but it should be noted that a CD-I player for example, may be aware of the language being used for user interaction, and could store literal instructions such as "TOO BRIGHT" in a number of languages, reproducing the appropriate one at each occasion.

The lower half of FIG. 2 also includes two further downward arrow-shaped regions 106' and 108', which are two and three levels below black level, respectively. Thus the number of down arrows visible given the user an indication of the extent of the just how far from the correct setting the brightness setting actually is.

Figure 3:
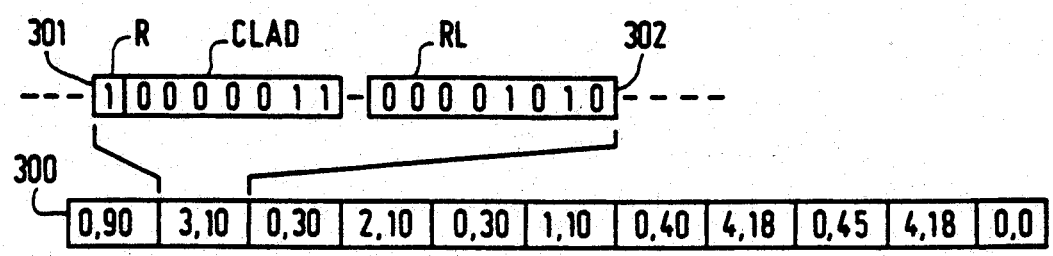
FIG. 3 illustrates the coding of a line of the test image to cause generation of a test signal by the CD-I player of FIG. 1.

FIG. 3 illustrates how one representative line of pixels in the test image of FIG. 2, lower half, may be encoded to cause generation of the appropriate test signal. 7-bit run-length CLUT coding has been chosen from the range of techniques available in the CD-I video decoder VD. This is a compact format, but any of the other formats could be used. The first task is to load the color look-up table with the red, green and blue values defining each of the color used in the desired test image. An example is shown in Table 1.

TABLE 1

| CLAD | R | G | B |
| --- | --- | --- | --- |
| 0 | 16 | 16 | 16 |
| 1 | 12 | 12 | 12 |
| 2 | 8 | 8 | 8 |
| 3 | 4 | 4 | 4 |
| 4 | 20 | 20 | 20 |
| 5 | 24 | 24 | 24 |
| 6 | 28 | 28 | 28 |
| . | . | . | . |
| . | . | . | . |
| . | . | . | . |
| 127 | — | — | — |

The first column CLAD in Table 1 is a 7-bit CLUT address in the range 0-127. The CLUT address CLAD then acts as an index to the three 8-bit values R, G and B that define the color indexed by that address. In Table 1, R=G=B for all table entries, since only neutral tinted greys are to be reproduced. In general use, the CLUT can address a color gamut of more than 10 million colors.

For the first CLUT entry, CLAD=0, R,G,B=16, meaning that CLAD=0 represents the color black, used for the background region 100'. CLAD=1, 2 and 3 represent the three levels below black used in the arrow regions 102', 106' and 108', respectively. Although in the 8-bit coding scheme described, the three levels closest below black (16) are 15, 14 and 13, the CLUT locations 1, 2 and 3 have been loaded with values R,G,B=12, 8 and 4, respectively, for two reasons. One reason is that, in the CD-I player specification ('base case decoder'), it is only necessary for the analog video output signals R, G and B to be generated to 6-bit accuracy (64 levels). Thus, although 8-bit values are stored on the disc and within the player, the output D/A converters might convert only the six most significant bits of each color value. Thus two color values must be separated by at least four levels on the 8-bit scale to ensure that they are in fact distinguishable in the video output signal. The second reason for using steps of 4 levels is that, even if the video output is generated to 8-bit accuracy, the user's eye would have difficulty discerning the features of the test image if they were separated by only one level. Moreover, the brightness adjustment on the display device may be too coarse to allow adjustment with 8-bit precision. Similarly, for CLAD=4, the CLUT is loaded with R,G,B=20, to be used as the first grey level above black, in region 104'.

The line L in FIG. 2 indicates a one representative scanline (pixel row) of the test image which is runlength coded as now described with reference to FIG. 3. The line L is at normal resolution 384 pixels long and it is assumed for the purposes of this example that the line L comprises, from left to right: first a run of 90 pixels at black level (background region 100'); next a run of 10 pixels at 3 levels below black (region 108'); 30 pixels at black level; 10 pixels at 2 levels below black (region 106'); 30 pixels at the level below black (region 102'); 40 pixels at black level; 18 pixels at the grey level above black (region 104'); 45 pixels at black level; 18 pixels at the grey level above black (region 104'); and finally 83 pixels at black level. These eleven runs are represented by a sequence of number pairs at 300 in FIG. 3. The CD-I standard specifies that a pair of bytes can be used to represent a run of up to 255 pixels, and this format is used in FIG. 3 as follows.

A representative byte pair 301,302 is shown in FIG. 3. The first byte 301 comprises a first bit R, which is set at 1 to indicate that run length coding is being used (R=0 indicates coding of an individual pixel). The remaining 7 bits of the first byte contain the CLUT address CLAD where the desired color has been stored. In the example, CLAD is binary 0000011, or 3 in decimal. The second byte 302 stores in binary RL, the run length. In the example, this is binary 00001010, or 10 in decimal. Thus the byte pair shown defines a run of ten pixels, with color CLAD=3, in other words, the part of region 108' lying on line L.

Each run of pixels in a particular colors is represented by a similar byte pair, so that the sequence 300 of eleven number pairs can be encoded in 22 bytes for decoding by the video decoder VD. The last run of black pixels is encoded with a run length byte RL=zero, which tells the decoder VD that this run is the last on the line and continues to the end of the line.

Those skilled in the art will readily appreciate the wide variety of test images that are possible within the scope of the present invention. The second image feature 100/104 could be made to form a more explict 'correct' symbol when seen alone. Background and foreground colors may be reversed, and flashing colors or other animation effects can be used to improve visibility of the various regions if desired. In the CD-I embodiment described, these effects can be achieved simply by modifying the CLUT entries, rather than storing multiple test images. In a CD-I application, the storage space occupied by the necessary program can be only a few kilobytes out of the total of 600 Mbytes available, while the improvement in ease of use and the picture quality can be substantial.

The skilled reader will readily appreciate how the invention can be applied in other types of display apparatus than the CD-I player. In a television receiver, the test signal generator could be readily incorporated for example in the on-screen display hardware which is already incorporated in many modern televisions, or in a teletext decoder. The test image would preferably appear on the screen or a part of it automatically when the brightness control is activated. In a VCR, a test signal generating circuit could be included in a similar manner. Alternatively, a display apparatus according to the invention could be made from an existing VCR by if the test signal is recorded on a video cassette tape. The test signal might for example be recorded for a few seconds at the start of a commercial pre-recorded video cassette, enabling the viewer to ensure correct adjustment of his/her television brightness before the start of the recorded program. The skilled reader may also conceive similar test signals for the correct setting of other display device properties, for example contrast, color or picture sharpness.

From reading the present disclosure, other variations will be apparent to persons skilled in the art. Such variations may involve other features which are already known in the design, manufacture and use of display systems and devices and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A video signal processing apparatus comprising means for generating video signals to enable the display of still or motion pictures on a connected display device, and means for generating a test signal to enable the display of a test image to facilitate user adjustment of a property of the display device to a correct setting which provides optimum representation of the said pictures, characterized in that the test image includes a first image feature imperceptible at the correct setting, but visible when the display device deviates in a given direction from the correct setting, and in that the first image feature when visible forms at least part of a symbolic instruction to the user indicating the nature of the deviation and/or the necessary corrective adjustment.

2. An apparatus as claimed in claim 1, wherein the video signals include luminance information ranging upwards from a black level, the first image feature of the test image comprising a first region at black level adjoining a second region at a level, below black level respectively, these regions being represented in the test signal but being indistinguishable in the test image when displayed at the correct setting of the display device.

3. An apparatus as claimed in claim 1, wherein the test image further includes a second image feature which is just visible at the correct setting, but becomes imperceptible in the event of excessive corrective adjustment.

4. An apparatus as claimed in claim 1, wherein the test signal generating means is arranged to cause generation of the test signal automatically in response to a user commencing adjustment of the display property.

5. An apparatus as claimed in claim 1, wherein the video signal generating means comprises means for reproducing still or motion picture sequences stored on a record carrier, the test signal generating means operating automatically or at user selection to facilitate adjustment of the connected display device prior to viewing the stored pictures.

6. An apparatus as claimed in claim 5, wherein the test signal is defined by information stored on the record carrier together with the pictures to be displayed.

7. An apparatus as claimed in claim 5, wherein the record carrier is a Compact Disc read-only memory (CD-ROM).

8. A method of storing pictures on a record carrier for subsequent reproduction via a display device having at least one user-adjustable display property, the method comprising:
  (a) storing picture information on the record carrier in a form suitable for reproduction by the display device;
  (b) defining a test signal suitable for causing the display of a test image including a first image feature imperceptible at a display property setting which is correct for the display of the stored pictures but visible when the display property deviates in a given direction from the said correct setting; and
  (c) storing information defining the test signal on the record carrier together with the picture information, characterised in that the first image feature, when visible, forms at least part of a symbolic instruction to the user indicating the nature of the deviation and/or the necessary corrective adjustment.

9. A method as claimed in claim 8 wherein the step (b) includes:
  identifying a range of luminance levels to be represented in the display of the recorded pictures, said range extending upwards from a black level;
  defining as the first image feature a first region at the black level adjoining a second region at a level below the black level respectively, these regions being represented in the stored definition of the test signal.

10. A method as claimed in claim 8, wherein the step (a) comprises encoding digitized photographs and storing the resulting code on the record carrier, while step (c) comprises storing code for configuring the display apparatus to generate the test signal synthetically.

11. A method as claimed in claim 8, wherein the record carrier is a Compact Disc read only memory (CD-ROM).

12. A record carrier whereon pictures have been stored by a method as claimed in claim 8.

* * * * *